Figure 1:
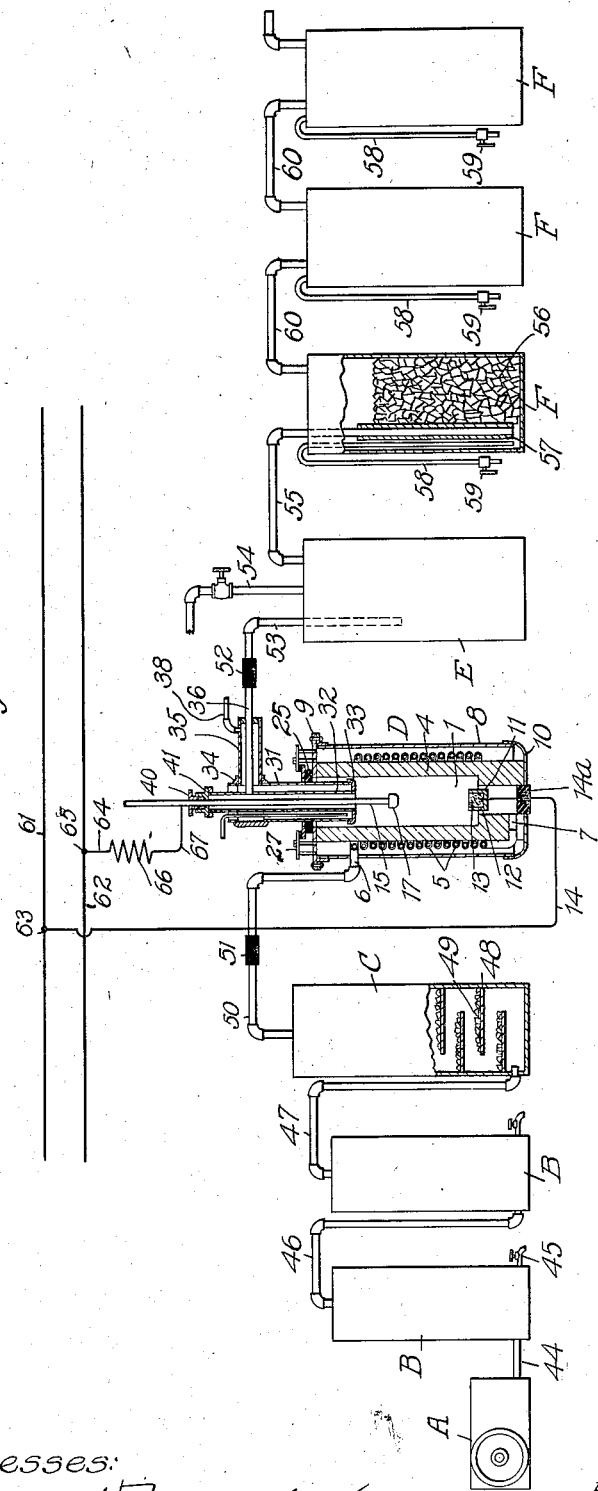

H. D. RANKIN.
TREATMENT OF GASES.
APPLICATION FILED JULY 6, 1909.

1,056,830.   Patented Mar. 25, 1913.
2 SHEETS—SHEET 1.

Witnesses:
Leonard W. Novander
George E. Higham

Inventor
Harry D. Rankin
By Brown & Williams
Attorneys

UNITED STATES PATENT OFFICE.

HARRY D. RANKIN, OF JOLIET, ILLINOIS, ASSIGNOR TO AMERICAN NITROGEN COMPANY, A CORPORATION OF ILLINOIS.

TREATMENT OF GASES.

1,056,830.    Specification of Letters Patent.    Patented Mar. 25, 1913.

Application filed July 6, 1909. Serial No. 506,044.

*To all whom it may concern:*

Be it known that I, HARRY D. RANKIN, a citizen of the United States, residing at Joliet, in the county of Will and State of Illinois, have invented certain new and useful Improvements in the Treatment of Gases, of which the following is a full, clear, concise, and exact description, reference being had to the accompanying drawings, forming a part of this specification.

My invention relates to the treatment of gases and has particular reference to apparatus used for combining any mixture of nitrogen and oxygen and the subsequent absorption of the gas thus formed, in order to produce compounds of nitrogen, *e. g.* nitric acid.

I am aware that many attempts have been made to produce compounds of nitrogen, *e. g.* nitric acid from mixtures of nitrogen and oxygen, *e. g.* air, but hitherto these attempts have proved unsuccessful from a commercial point of view, either on account of the inoperativeness of the process itself or on account of the excessive cost of carrying on the operation. In my invention I pass the compressed gases into and out of an otherwise hermetically sealed furnace and inside of this furnace the mixture of oxygen and nitrogen is subjected to the action of an electric arc and the following characteristic reactions take place:

(1) $N_2 + O_2 = 2NO$
(2) $2NO + O_2 = 2NO_2$

Besides the oxids formed by the above reactions, other lower oxids may be formed as $N_2O$, $N_2O_3$, etc. The exact nature of these subsidiary reactions is more or less indefinite.

The oxids of nitrogen which are formed by means of the electric arc, are readily dissociated at the high temperature of the arc and, in order to fix the oxids, I have found it necessary to immediately cool the gases which result from the above mentioned reactions. These gases are conducted from the combining furnace through water cooled pipes to a mixing chamber where, if necessary, additional oxygen, *e. g.* by the addition of air, may be provided in order to bring about reaction (2) provided it has not already taken place in the furnace.

The mixing chamber may also be used as a dust trap to catch the small particles of dust from the lining of said furnace and from the electrodes which come from the combining furnace. From the mixing chamber, the gases pass to absorption towers which are filled with water. The reaction $$2H_2O + 4NO_2 + O_2 = 4HNO_3$$

takes place. In order to insure the complete absorption of the oxids of nitrogen, the gases are preferably passed through several towers, the order of their passage from tower to tower being changed at intervals when the nitric acid from any one tower has reached the strength which it is desired to manufacture. The acid is then drawn off from the tower and fresh water added.

I have found that in place of using a mixing chamber, which also acts as a dust trap, the dust from the furnace may be caught in the first tower.

Another feature of my invention consists in preheating the air by means of passing it through a coil which encircles the combining furnace. In this way it is possible to bring about the combining action much quicker than would be the case if cold gases were employed.

Still another feature consists in the use of other gases or liquids, *e. g.* methane, steam, etc., and of special electrodes, the upper electrodes being constructed of any suitable material, *e. g.* iron or steel, and suitably cooled, whereas the lower electrode consists of a suitable composition, *e. g.* of calcium carbid, the magnetic oxid of iron and the oxids of copper, chromium, nickel, uranium, titanium and vanadium, which is partly melted by the action of the arc and during the operation of the furnace remains partly in a molten condition. The action of these gases, vapors, liquids and special electrodes is important inasmuch as they cause the gas to be ionized and as a result of such ionization the electrical resistance between the electrodes and the chemical resistance between the molecules of the acting fluids is materially diminished. This is a feature of considerable importance inasmuch as the mixture of oxygen and nitrogen introduced in the furnace chamber is generally under a pressure of from three to ten atmospheres and without the ionization the resistance between the electrodes and interacting molecules would be increased to an undue extent; whereas, with the said fluids and electrodes the speed of the reaction is greatly increased.

The arc formed between the electrodes extends to a considerable distance beyond the ends of the electrodes. It is important that the gases passing through the combining chamber of the furnace should not flow too rapidly as under such circumstances the arc would be blown out and, on the other hand, it must not flow too slowly as in the latter case, the combined oxids of nitrogen would not be cooled sufficiently soon to prevent dissociation.

An advantage of considerable importance arising from the construction of my furnace is that on account of having the gases in the combining chamber under considerable pressure, if a puncture occurs in the water cooled electrode, the water will not escape through this puncture into the chamber but the pressure causes the water to back up and the combining chamber is thereby kept from any danger of flooding.

It is, of course, necessary that the two electrodes should be entirely insulated from each other and in order to accomplish this the metallic work of the furnace is provided with insulation as will be described in detail hereinafter. The conditions of insulation are somewhat difficult to be met and it is largely to render this insulation easier that the gas is passed through suitable driers before it enters the combining chamber of the furnace.

These and other advantages of my system will be more apparent by reference to the drawings, in which—

Figure 3:
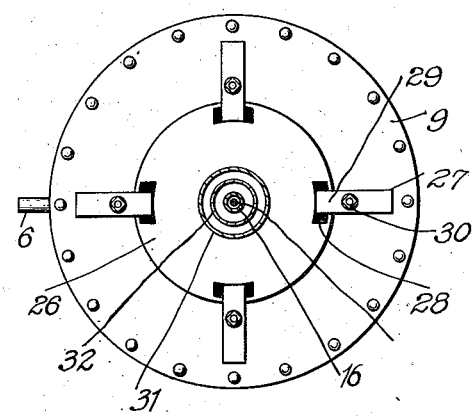
Figure 4:
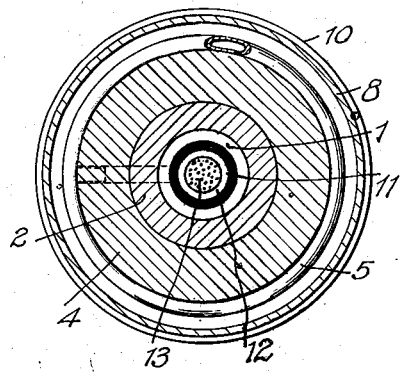
Figure 2:
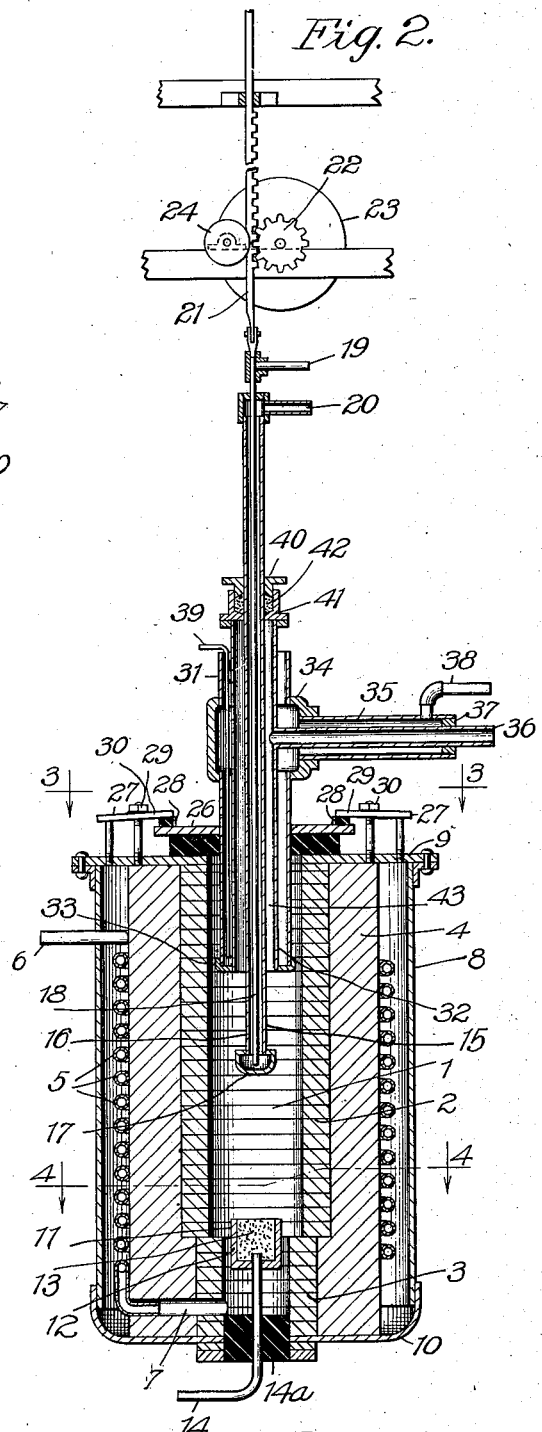

Figure 1 is a diagrammatic elevation of my complete system, Fig. 2 is a vertical section of the combining furnace, Fig. 3 is a view on the line 3—3 of Fig. 2, and Fig. 4 is a sectional view on the line 4—4 of Fig. 2.

In order to understand more readily the operation of my system as a whole, I will first describe the detailed construction of the combining furnace as shown in Figs. 2, 3 and 4. The combining chamber 1 is surrounded by a wall 2 of refractory material. For this purpose I prefer to use magnesite, bauxite, chrome or some other form of material which has extremely refractory properties, this feature being necessary on account of the high temperatures which are attained by means of the arc. The lower part 3 of the wall 2 is of somewhat smaller diameter than the main chamber of the furnace, as will be described more in detail hereafter. Outside of the walls 2 and 3, is a second layer of refractory material 4 or fragments of such material. Outside of the layer 4 is a coil 5 through which the mixture of oxygen and nitrogen, e. g. air, is introduced to the furnace, the gases entering at the upper portion 6 of the coil, and being delivered to the lower part of the combining chamber through the portion 7. Outside of the coil 5 is the iron or steel shell 8, to which is riveted a steel top 9. The bottom of the furnace is similarly provided with a steel plate 10 which is suitably riveted to the shell 8.

In the lower portion of the combining chamber 1 is provided the lower electrode 11, this electrode consisting of a refractory cup 12 in which is placed the readily fusible composition 13. A perforation is provided in the bottom of the cup 12 through which the conductor 14 is brought into contact with the composition 13. The lower part of the combining chamber 1 is sealed by means of a block of insulating material 14ª through which the conductor 14 passes. The upper electrode 15 is constructed of any suitable material, e. g. iron or steel alone or charged with the material of the upper electrode, and is suitably cooled. A pipe 16 is provided on its lower end with a rounded head or extension 17, the inside of which is continuous with the inside of the pipe 16. Within the pipe 16 is provided a second smaller pipe 18. It is clear that any cooling medium may be introduced in the pipe 18 through the pipe 19 and that after passing through the extension 17, this cooling medium will flow upwardly between the outside of the pipe 18 and the inside of the pipe 16, and will then be carried away through the outlet 20. An electrical connection may be made on any point of the pipe 16 with the opposite terminal of the source of current to that with which the conductor 14 is connected. Attached to the upper part of the pipe 18 is a rack 21 movable in a vertical plane by means of a pinion 22 which is rigidly connected to the disk 23 on which is mounted a handle not shown in the drawings. A rotary guide 24 serves to hold the rack 21 in engagement with the pinion 22. Inasmuch as the pipes 16 and 18 are rigidly connected, it is evident that the electrode 15 may be moved as a whole in a vertical plane.

The top of the furnace 9 is provided with a gasket 25 of insulating material on which rests the circular plate 26, provided with an opening as will be described hereafter. The plate 26 is securely held in position by means of clamps 27 which engage pieces of insulating material 28, as, for example, mica, which, in turn, rest on the plate 26. The horizontal member 29 of the clamp 27 may be adjusted by turning the nut 30. It is clear that by this construction the plate 26 is electrically insulated from the shell 8 and the top 9 of the furnace.

Passing through the opening of the plate 26 is the cooling apparatus for the gases passing out of the furnace. This cooling mechanism consists of an outer shell 31 and an inner shell 32, the lower portions of these two shells being sealed by means of the angle irons 33. The space between the upper portions of these two shells is allowed to remain open. In the portion above the furnace proper, the outer shell 31 is interrupted and a coupling 34 is inserted. Laterally extending from this coupling is the pipe 35 through which passes a smaller pipe 36 which connects with the inside of the inner shell 32. The space between the outer end of the pipe 35 and the pipe 36 is sealed by the portion 37. An outlet pipe 38 communicates through the pipe 35 with the space between the pipes 35 and 36. A pipe 39 is introduced in the space between the outer shell 31 and the inner shell 32 and passes downwardly to a position near the lower edges of these shells. It is now clear that if water is introduced through the pipe 39, it will fill the space between the shells 31 and 32 and the space between the pipes 35 and 36 will then pass through the outlet 38.

The electrode 15 is adapted to move within a bearing which is composed of a collar 40 which fits within a second collar 41. Between these two collars is placed packing 42 so that it is impossible for gases to escape from the furnace between the pipe 16 and the collars 40 and 41. The inner shell 32 is securely attached to the lower collar 41. It is clear from the construction which we have described that there is a space between the inner shell 32 and the outer pipe 16 of the electrode 15. This space 43 connects directly with the interior of the combining chamber 1. It is evident that if gases under pressure are contained in the chamber 1, they will pass outwardly through the space 43 and the pipe 36. During this passage through the space 43 and the pipe 36, the outgoing gases are subjected to the cooling action of the cooling medium, e. g. water, flowing between the outer shell 31 and the inner shell 32 and between the pipes 35 and 36. The gases are thus immediately cooled after leaving the combining chamber 1, which is a feature of great importance in the operation of my invention.

Having described the detailed construction of my furnace, I will now deal with the operation of my system as a whole, as diagrammatically illustrated in Fig. 1.

A is an air compressor which connects by means of the pipe 44 with the mechanical drier B. As the compressed fluids e. g. mixture of oxygen and nitrogen, such as air, enters the drier B, it immediately expands with the result that the moisture is precipitated from the air, this moisture being periodically drawn off through the stopcock 45. If desired, a second drier B may be connected with the first drier, by means of pipe 46 and additional mechanical driers may be used, if necessary. From the last mechanical drier, the air passes through the pipe 47 to the bottom of the chemical drier C, the interior of this drier being provided with a series of shelves 48 on which is placed lime 49, or other desiccating material. The air next passes from the upper part of the drier C through the pipe 50. This pipe is provided with an electrical insulating section 51. The mixture of oxygen and nitrogen, e. g. air, next passes through the pipe 6 and the heating coil 5 of the electric combining furnace D. The mixture of oxygen and nitrogen e. g. air enters the lower part of the combining chamber 1 through the portion 7 of the preheating coil 5, passes upwardly past the lower electrode 11 into the principal portion of the combining chamber 1, and then upwardly between the upper electrode 15 and the inner shell 32, and then through the outlet pipe 36 which is provided with an insulating section 52. The compound of oxygen and nitrogen found e. g. oxid of nitrogen next passes through the pipe 53 into the mixing chamber E into which additional oxygen e. g. by means of air may be introduced through the pipe 54, if so desired. The mixing chamber E also acts as a dust trap and purifies the gases from dust and other impurities. The gases next pass through the pipe 55 to the bottom of the absorption chamber F, constructed of wood which has been treated with melted paraffin, for example, by first boiling said wood in crude paraffin, whereby the greater portion of the resinous material is eliminated and then treating the said wood with refined paraffin, whereby it becomes coated with a thick layer thereof. Or, the wood may be so treated with any other compound insoluble in nitric acid. The absorption chamber is filled with water in which are placed pieces of any suitable material, e. g. quartz 56 in order to more effectually break up the gases and promote absorption. The pipe 55 is provided inside of the tank with a wooden inclosing shell 57 so that the pipe may be readily withdrawn for repairs and again placed in position without disturbing the quartz 56.

A sampling pipe 58 leads to the bottom of the absorption tank F and through this pipe a small quantity of water and its absorbed gases may be withdrawn at any time through the valve 59 for testing purposes. The unabsorbed portion of gases passes through the pipe 60 to a second absorption chamber F and from this chamber through a second pipe 60 to still another absorption chamber. The number of these chambers may be multiplied as desired in order to obtain a perfect absorption of the gas or gases. Suitable piping may be provided so that the gases will enter any desired absorption tank first and then pass to the others in any desired order. When the test shows that the water has absorbed the desired amount of nitric oxid, this tank is cut off from the supply of gases and the nitric acid is drawn off. It is then refilled with water and the absorption process begins once more.

The current is supplied to the combining furnace D from two electric mains 61 and 62 which are connected to the two terminals of an electric generator.

The conductor 14 is connected to the main 61 at the point 63 and the conductor 64 is connected to the main 62 at the point 65. The current from the main 62 passes through the conductor 64 and a resistance 66, and then through the conductor 67 to the upper electrode 15 of the combining furnace.

When it is desired to start the operation of my apparatus, the electrode 15 is lowered until it makes contact with the electrode 11 and is then gradually raised, the length of the arc thereby being increased. The mixture of oxygen and nitrogen, e. g. air from compressor A passes through the driers as described above and enters the lower portion of the furnace through the portion 7 of the coil 5. As explained above, it is important that the mixture of oxygen and nitrogen should pass through the combining chamber 1 at such a rate that the oxids of nitrogen which are formed by the electric arc, come within the cooled shell 32 sufficiently quickly so that the gases are not dissociated; while, on the other hand, the speed of the gases must not be such that the arc will be blown out by the action of these gases. It is clear in this connection that the size of the combining chamber 1 with respect to the fluids passing therethrough and the size of the arc is of vital importance. The fluids must pass uniformly and steadily through the combining chamber, in order not to blow out or disrupt the arc. Moreover, the chamber must be of such character that the mixture of nitrogen and oxygen passing therethrough will be subjected to the action of the arc. The chamber must be long or high enough to complete the combining action, and not so long that there will be dissociation of the gases. As a matter of practical experience, I have found that a combining chamber having a height of about 30 inches from the lower part of the cooling shells 31 and 32 to the lower part of the wall 1, a diameter of 7 inches, a distance between electrodes of not less than 3 inches, an operating current of 100 amperes on a low tension circuit, gives satisfactory results. The oxids of nitrogen which have been fixed in the combining chamber are immediately cooled by the action of the cooling medium, e. g. water, between the shells 31 and 32 and also by the cooling medium, e. g. water, between the outside of the pipe 36 and the inside of the pipe 35, and thereby prevented from dissociating.

After the oxids of nitrogen have been fixed it is evident that many different processes of forming compounds of nitrogen e. g. nitric acid or nitrates, may be used from that which I have described, many of such processes being well known in the art. In the absorption apparatus I have found that it is advisable to use pipes which are but little affected by the action of the gases, as, for example, porcelain lined or aluminum pipes, which have been boiled in refined paraffin, preferably in a vacuum.

Many changes could be made in the detailed construction of the apparatus which has been described above, without departing from the spirit of my invention.

What I claim as new and desire to cover by United States Letters Patent is:

1. In apparatus for combining gases, the combination of a combining chamber, a coil surrounding and communicating with said chamber, said coil adapted to preheat the gases in their passage therethrough, electrical means for heating said gases within said chamber, and means for delivering said gases from said chamber.

2. In apparatus for oxidizing a gas, the combination of an oxidizing chamber, a coil surrounding said chamber and communicating therewith, said coil adapted to preheat said gas and oxygen mixed therewith in its passage through said coil, electrical means for producing an arc within said chamber, means for delivering the gases from said chamber, and means for water cooling said gases on their outward passage.

3. In apparatus for the treatment of gases, the combination of a combining chamber, an inlet for the gases into said chamber, a metallic electrode, a second metallic electrode adapted to form an arc with the first electrode, said second electrode adapted to become molten by the action of the arc, and an outlet for the gases from said combining chamber.

4. In apparatus for the treatment of gases, the combination of a combining chamber, means for introducing the gases into said chamber under pressure, means for retaining the pressure within said chamber, a water cooled metallic electrode, a second electrode adapted to form an arc with said first electrode, said second electrode adapted to become molten under the action of said arc, and means for delivering the gases from said chamber.

5. In apparatus for oxidizing a gas, the combination of an oxidizing chamber, an inlet for exclusively introducing a mixture of said gas and oxygen into chamber under pressure, means for sealing said chamber, a water cooled metallic electrode, a second readily fusible electrode adapted to form an arc with said first electrode, and an outlet for the gases from said chamber.

6. In apparatus for oxidizing a gas, the combination of an oxidizing chamber, an inlet for introducing a mixture of said gas and oxygen into said chamber under pressure, means for sealing said chamber, a water cooled metallic electrode, a second readily fusible electrode adapted to form an arc with said first electrode, an outlet for the gases from said chamber, and means for cooling the gases in their outward passage.

7. In apparatus for combining the nitrogen and oxygen of air, the combination of a combining chamber, an inlet for the air into said chamber, a water cooled metallic electrode, a second electrode adapted to form an arc with said first electrode, said second electrode adapted to become molten under the action of the arc, and an outlet for the gases from said combining chamber.

8. In apparatus for combining the nitrogen and oxygen of air, the combination of a combining chamber, means for introducing the air into said chamber under pressure, means for retaining the pressure within said chamber, a water cooled electrode, a second electrode adapted to form a flaming arc with said first electrode, said second electrode adapted to become molten with a rise of temperature, means for delivering the combined gases from said chamber, and means for cooling said gases on their upward passage.

9. In apparatus for combining the nitrogen and oxygen of air, the combination of a combining chamber, means for preheating the air, means for introducing the preheated air into said chamber under pressure, means for retaining the pressure within said chamber, a water cooled electrode within said chamber, means for adjusting the position of said electrode, a second readily fusible electrode adapted to form a flaming arc with said first electrode, and an outlet from said chamber.

10. In apparatus for combining the nitrogen and oxygen of air, the combination of a combining chamber, means for preheating the air, means for introducing the preheated air into said chamber under pressure, means for retaining the pressure within said chamber, a water cooled electrode within said chamber, means for adjusting the position of said electrode, a second readily fusible electrode adapted to form a flaming arc with said first electrode, an outlet from said chamber, and means for cooling said gases on their outward passage.

11. In apparatus for combining the nitrogen and oxygen of air, the combination of a combining chamber, a coil surrounding and communicating with said chamber, said coil adapted to preheat the air passed therethrough, means for introducing air under pressure through said coil to said chamber, means for retaining the pressure within said chamber, a water cooled metallic electrode within said chamber, means for adjusting the position of said electrode, a second fusible electrode adapted to form a flaming arc with said first electrode, refractory means for containing said fusible electrode, and means for delivering the gases from said chamber.

12. In apparatus for combining mechanically mixed gases, the combination of a combining chamber, means for preheating said gases, means for exclusively introducing said preheated gases into said chamber under pressure, means for retaining the pressure within said chamber, a pair of electrodes within said chamber, said electrodes adapted to form between them a flaming arc, means for electrically insulating said electrodes from each other, and a water cooled outlet from said chamber.

13. In a system for combining gases, the combination of means for first compressing gases, means for then drying the gases, means for then preheating the gases, a combining chamber, means for then delivering the gases to said chamber under pressure, means for sealing said chamber, means for then subjecting said gases to the action of an electric arc, and means for then delivering said gases from said chamber.

14. In apparatus for combining gases, the combination of a combining chamber, a coil surrounding and communicating with said chamber, said coil adapted to preheat the gases in their passage therethrough, and means for heating said gases within said chamber.

15. In apparatus for oxidizing a gas, the combination of an oxidizing chamber, a coil surrounding said chamber and communicating therewith, said coil adapted to preheat said gas and oxygen mixed therewith in its passage through said coil, and means for heating said gases within said chamber.

16. In apparatus for treating gases, the combination of a chamber, an inlet into said chamber, an electrode, a second electrode adapted to form an arc with said first electrode, said second electrode adapted to become molten under the action of the arc, and an outlet for said chamber.

In witness whereof, I hereunto subscribe my name this first day of July, 1909.

HARRY D. RANKIN.

Witnesses:
 EDSON R. WOLCOTT,
 ERNEST M. DICKEY.